US010823840B2

(12) United States Patent
Yang et al.

(10) Patent No.: US 10,823,840 B2
(45) Date of Patent: Nov. 3, 2020

(54) COLLABORATIVE NODE-BASED POSITIONING METHOD, TO-BE-POSITIONED NODE, AND COLLABORATIVE NODE

(71) Applicant: HUAWEI TECHNOLOGIES CO., LTD., Shenzhen (CN)

(72) Inventors: Hui Yang, Beijing (CN); Xun Yang, Shenzhen (CN); Kaiyao Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/432,112

(22) Filed: Jun. 5, 2019

(65) Prior Publication Data
US 2019/0285739 A1  Sep. 19, 2019

Related U.S. Application Data

(63) Continuation of application No. PCT/CN2017/113015, filed on Nov. 27, 2017.

(30) Foreign Application Priority Data

Dec. 6, 2016 (CN) .......................... 2016 1 1108810

(51) Int. Cl.
*G01S 5/02* (2010.01)
*G01S 13/87* (2006.01)
*H04W 64/00* (2009.01)

(52) U.S. Cl.
CPC .............. *G01S 13/878* (2013.01); *G01S 5/02* (2013.01); *H04W 64/00* (2013.01)

(58) Field of Classification Search
CPC ..... H04W 64/00; H04W 4/023; H04W 84/18; H04W 84/20; G01S 13/878; G01S 5/0072;

(Continued)

(56) References Cited

U.S. PATENT DOCUMENTS 8,929,550 B2 * 1/2015 Shattil ................... H04L 63/061
380/270
2004/0157620 A1 * 8/2004 Nyu ...................... H04W 4/029
455/456.1

(Continued)

FOREIGN PATENT DOCUMENTS

CN  102083201 A  6/2011
CN  103444246 A  12/2013

(Continued)

OTHER PUBLICATIONS

La Scala B F et al: Node Self-Localisation in Large Scale Sensor Networks, Information, Decision and Control, 2007. IDC "07, IEEE, PI, Feb. 1, 2007, pp. 188-192, XP031181134.

*Primary Examiner* — Nathan S Taylor
(74) *Attorney, Agent, or Firm* — Womble Bond Dickinson (US) LLP

(57) ABSTRACT

This application provides a collaborative node-based positioning method, a to-be-positioned node, and a collaborative node. The method includes: obtaining a collaborative positioning node list corresponding to each collaborative node that can directly communicate with the to-be-positioned node; selecting, according to the collaborative positioning node list corresponding to each collaborative node, a collaborative node corresponding to a collaborative positioning node list in which a quantity of collaborative nodes being the same as that in a target list corresponding to the to-be-positioned node is largest; and performing positioning on the to-be-positioned node by using an anchor node and each monitoring node, where the anchor node is the selected collaborative node, and each monitoring node is each of same collaborative nodes between the collaborative positioning node list corresponding to the anchor node and the target list.

10 Claims, 10 Drawing Sheets

(58) Field of Classification Search
CPC .......... G01S 5/02; G01S 5/0284; G01S 19/05; G01S 2205/008; G01S 5/0252; G01S 5/0289
See application file for complete search history.

(56) References Cited

U.S. PATENT DOCUMENTS

| | | | |
|---|---|---|---|
| 2010/0173592 A1* | 7/2010 | Yamazaki | H04B 7/0615 455/69 |
| 2013/0288673 A1* | 10/2013 | Le | H04W 48/18 455/434 |
| 2013/0331125 A1* | 12/2013 | Dini | G01S 5/02 455/456.1 |
| 2014/0045530 A1* | 2/2014 | Gordon | H04W 4/029 455/456.2 |
| 2014/0140188 A1* | 5/2014 | Shattil | H04L 27/2601 370/208 |
| 2014/0140189 A1* | 5/2014 | Shattil | H04B 7/026 370/208 |
| 2015/0139212 A1 | 5/2015 | Wang et al. | |
| 2015/0230055 A1* | 8/2015 | Smith | H04W 4/029 455/456.3 |
| 2015/0264530 A1 | 9/2015 | Prechner et al. | |
| 2016/0044524 A1 | 2/2016 | Ben-Haim et al. | |
| 2016/0080960 A1* | 3/2016 | Aldana | H04L 43/0858 370/252 |
| 2016/0205504 A1* | 7/2016 | Chen | H04W 64/00 455/456.1 |
| 2016/0345287 A1 | 11/2016 | O'Nuallain et al. | |
| 2017/0311126 A1* | 10/2017 | Lu | H04W 64/00 |
| 2018/0084519 A1* | 3/2018 | Zeng | G01S 5/0205 |
| 2019/0182796 A1* | 6/2019 | Wang | G01S 13/765 |
| 2019/0204407 A1* | 7/2019 | Heurguier | G01S 5/0289 |
| 2019/0257938 A1* | 8/2019 | Yang | H04L 1/16 |

FOREIGN PATENT DOCUMENTS

| | | | |
|---|---|---|---|
| CN | 103957510 A | 7/2014 | |
| CN | 104519566 A | 4/2015 | |
| CN | 106162869 A | 11/2016 | |
| EP | 3200520 A1 * | 8/2017 | .......... G01S 5/0289 |
| KR | 20150041240 A | 4/2015 | |
| WO | 2012131744 A1 | 10/2012 | |
| WO | WO-2012131744 A1 * | 10/2012 | .......... G01S 5/0289 |
| WO | WO-2014042565 A1 * | 3/2014 | .......... H04W 72/085 |

* cited by examiner

COLLABORATIVE NODE-BASED POSITIONING METHOD, TO-BE-POSITIONED NODE, AND COLLABORATIVE NODE

CROSS-REFERENCE TO RELATED APPLICATIONS

This application is a continuation of International Application No. PCT/CN2017/113015, filed on Nov. 27, 2017, which claims priority to Chinese Patent Application No. 201611108810.4, filed on Dec. 6, 2016. The disclosures of the aforementioned applications are hereby incorporated by reference in their entireties.

TECHNICAL FIELD

This application relates to the field of positioning technologies, and more specifically, to a collaborative node-based positioning method, a to-be-positioned node, and a collaborative node.

BACKGROUND

An indoor positioning technology is a technology for navigating to and tracking an indoor object in an indoor environment. A common positioning technology among indoor positioning technologies is a ranging-based positioning technology, and a principle of the ranging-based positioning technology is that: A distance between a to-be-positioned node and anchor nodes is measured, to obtain a plurality of groups of distance information, and then, a position of the to-be-positioned node is determined according to the plurality of groups of distance information by using a positioning algorithm such as a triangulation positioning algorithm. The to-be-positioned node is a node whose position information needs to be obtained by using the indoor positioning technology. The anchor node is a node whose position information is known and that is used to measure a distance to the to-be-positioned node.

FIG. 1 shows a collaborative positioning framework. In the collaborative positioning framework, an access point (AP) is used as an anchor node; a station (STA) is used as a to-be-positioned node; and a collaborative node Sn (which may be $S_2$, $S_3$, or $S_4$ in FIG. 1) located around the AP and the to-be-positioned node may be used as a monitoring node, where the monitoring node is a node used to collaborate with the AP in positioning the STA. A positioning process is as follows:

The STA initiates an fine timing measurement (FTM) request to the AP. After receiving the FTM request, the AP initiates FTM measurement, and sends an FTM action frame. After receiving the FTM action frame, the STA sends a fine timing measurement response frame, for example, sends a feasible manner acknowledgement (ACK) of the fine timing measurement response frame. In a process in which the AP sends the FTM action frame and the STA sends the ACK, the AP obtains a sending moment of the FTM action frame and a receiving moment of the ACK, and the STA obtains a receiving moment of the FTM action frame and a sending moment of the ACK. Similarly, each collaborative node Sn obtains $t_2\_Sn$ and $t_3\_Sn$. $t_2\_Sn$ is a receiving moment at which a collaborative node Sn receives the FTM action frame, and $t_3\_Sn$ is a receiving moment at which a collaborative node Sn receives the ACK.

Then, each collaborative node Sn sends moment information ($t_2\_Sn$ and $t_3\_Sn$) obtained by the collaborative node Sn and position information of the collaborative node Sn to the AP; the AP sends all moment information, position information of the AP, and position information of each Sn to the STA, and the STA obtains position information of the STA through calculation according to the information. All the moment information sent by the AP includes the moment information obtained by each Sn, and the sending moment of the FTM action frame and the receiving moment of the ACK that are obtained by the AP.

However, in FIG. 1, the AP cannot monitor a sending operation of another AP outside a communication range of the AP. Therefore, the another AP becomes a hidden terminal for the AP in FIG. 1. In a process in which the AP sends the FTM action frame to the STA and the STA feeds back the ACK frame to the AP, the another AP may also send an FTM action frame to the STA. As a result, FTM action frames sent by a plurality of APs arrive at the STA simultaneously, an information conflict is caused, and finally all information sent to the STA is lost. Therefore, how to reduce a probability of a threat from a hidden terminal in a current indoor positioning technology is a technical problem to be resolved urgently.

SUMMARY

This application provides a collaborative node-based positioning method, a to-be-positioned node, and a collaborative node, so as to reduce a probability of a threat from a hidden terminal. Technical solutions are as follows:

A first aspect of this application provides a collaborative node-based positioning method, where the method is executed by a to-be-positioned node, and the method includes: obtaining a collaborative positioning node list corresponding to each collaborative node that can directly communicate with the to-be-positioned node, where information about a node that can directly communicate with the collaborative node corresponding to the collaborative positioning node list is recorded in the collaborative positioning node list, and the node that can directly communicate with the collaborative node corresponding to the collaborative positioning node list is a node that can communicate, without relay by another node, with the collaborative node corresponding to the collaborative positioning node list; selecting, according to the collaborative positioning node list corresponding to each collaborative node, a collaborative node corresponding to a collaborative positioning node list in which a quantity of collaborative nodes being the same as that in a target list corresponding to the to-be-positioned node is largest, where node information of a collaborative node that can directly communicate with the to-be-positioned node is recorded in the target list corresponding to the to-be-positioned node; and performing positioning on the to-be-positioned node by using an anchor node and each monitoring node, where the anchor node is the selected collaborative node, and each monitoring node is each of same collaborative nodes between the collaborative positioning node list corresponding to the anchor node and the target list. In this way, in a positioning process, a quantity of monitoring nodes is greater than a quantity of monitoring nodes corresponding to another anchor node. In a same wireless communication coverage, a larger quantity of monitoring nodes leads to a higher possibility of discovering a hidden terminal among the monitoring nodes, so that a probability that the hidden terminal threatens the anchor node is reduced. In addition, when there are a larger quantity of monitoring nodes, more timestamp information is provided for performing positioning on the to-be-positioned node, thereby improving positioning accuracy of the to-be-positioned node to some extent.

A second aspect of this application provides a to-be-positioned node, where the to-be-positioned node includes: an obtaining unit, configured to obtain a collaborative positioning node list corresponding to each collaborative node that can directly communicate with the to-be-positioned node, where information about a node that can perform collaborative positioning and that exists in direct communication coverage of the collaborative node corresponding to the collaborative positioning node list is recorded in the collaborative positioning node list; a selection unit, configured to select, according to the collaborative positioning node list corresponding to each collaborative node, a collaborative node corresponding to a collaborative positioning node list in which a quantity of collaborative nodes being the same as that in a target list corresponding to the to-be-positioned node is largest, where node information of a collaborative node that can directly communicate with the to-be-positioned node is recorded in the target list corresponding to the to-be-positioned node; and a positioning unit, configured to perform positioning on the to-be-positioned node by using an anchor node and each monitoring node, where the anchor node is the selected collaborative node, and each monitoring node is each of same collaborative nodes between the collaborative positioning node list corresponding to the anchor node and the target list. In this way, in a positioning process, a quantity of monitoring nodes is greater than a quantity of monitoring nodes corresponding to another anchor node. In same wireless communication coverage, a larger quantity of monitoring nodes leads to a higher possibility of discovering a hidden terminal among the monitoring nodes, so that a probability that the hidden terminal threatens the anchor node is reduced. In addition, when there are a larger quantity of monitoring nodes, more timestamp information is provided for performing positioning on the to-be-positioned node, thereby improving positioning accuracy of the to-be-positioned node to some extent.

In an implementation, the obtaining a collaborative positioning node list corresponding to each collaborative node that can directly communicate with the to-be-positioned node includes: sending a collaborative positioning request in a broadcast mode, where the collaborative positioning request is used to obtain a collaborative positioning node list; and receiving a collaborative positioning response message sent by each collaborative node that can directly communicate with the to-be-positioned node, where the collaborative positioning response message carries at least the collaborative positioning node list or position information of the collaborative node; or the obtaining a collaborative positioning node list corresponding to each collaborative node that can directly communicate with the to-be-positioned node includes: receiving a message pushed by each collaborative node, where the message carries a collaborative positioning node list corresponding to the collaborative node, so that after the collaborative positioning node list corresponding to each collaborative node is updated, an updated collaborative positioning node list can be obtained in a timely manner.

In an implementation, the selecting, according to the collaborative positioning node list corresponding to each collaborative node, a collaborative node corresponding to a collaborative positioning node list in which a quantity of collaborative nodes being the same as that in a target list corresponding to the to-be-positioned node is largest includes: sequentially comparing identification information of all the collaborative nodes in the collaborative positioning node lists with identification information of each collaborative node in the target list corresponding to the to-be-positioned node, to obtain a collaborative node whose identification information is the same as that of each collaborative node in the target list; calculating a quantity of collaborative nodes, in each collaborative positioning node list, whose identification information is the same as that of each collaborative node in the target list; and selecting a collaborative node corresponding to a collaborative positioning node list in which a quantity of collaborative nodes whose identification information is the same as that of each collaborative node in the target list is largest.

In an implementation, the selecting, according to the collaborative positioning node list corresponding to each collaborative node, a collaborative node corresponding to a collaborative positioning node list in which a quantity of collaborative nodes being the same as that in a target list corresponding to the to-be-positioned node is largest includes: obtaining a quantity of collaborative nodes included in each collaborative positioning node list; starting from a collaborative positioning node list including a largest quantity of collaborative nodes, comparing identification information of each collaborative node in the collaborative positioning node list with identification information of each collaborative node in the target list corresponding to the to-be-positioned node, to obtain a collaborative node whose identification information is the same as that of each collaborative node in the target list; and when a quantity of collaborative nodes, in the collaborative positioning node list on which comparison is performed, whose identification information is the same as that of each collaborative node in the target list is greater than or equal to a quantity of collaborative nodes in a remaining collaborative positioning node list on which no comparison is performed, selecting a collaborative node corresponding to the collaborative positioning node list in which the quantity of collaborative nodes whose identification information is the same as that of each collaborative node in the target list is greater than or equal to the quantity of collaborative nodes in the remaining collaborative positioning node list, to reduce times of comparison and improve positioning efficiency.

In an implementation, the method further includes: updating information about each collaborative node that can directly communicate with the to-be-positioned node, to ensure normal communication between nodes.

In an implementation, the performing positioning on the to-be-positioned node by using an anchor node and each monitoring node includes: obtaining position information of the anchor node, a sending moment at which the anchor node sends a fine timing measurement action frame, and a second receiving moment at which the anchor node receives a fine timing measurement response frame; obtaining a first receiving moment at which the to-be-positioned node receives the fine timing measurement action frame and a sending moment at which the to-be-positioned node sends the fine timing measurement response frame; obtaining position information of each monitoring node, a receiving moment at which each monitoring node receives the fine timing measurement action frame, and a receiving moment at which each monitoring node receives the fine timing measurement response frame; and obtaining position information of the to-be-positioned node according to the position information of the anchor node, the sending moment at which the anchor node sends the fine timing measurement action frame, the second receiving moment at which the anchor node receives the fine timing measurement response frame, the first receiving moment at which the to-be-positioned node receives the fine timing measurement action frame, the sending moment at which the to-be-positioned node sends the fine timing measurement response frame, the position information of each monitoring node, the receiving moment at which each monitoring node receives the fine timing measurement action frame, and the receiving moment at which each monitoring node receives the fine timing measurement response frame, to eliminate an error caused when synchronization cannot be implemented between internal clocks of the to-be-positioned node, the anchor node, and each monitoring node, so as to improve calculation accuracy.

A third aspect of this application provides a collaborative node-based positioning method, where the method is executed by a collaborative node communicating with a to-be-positioned node, and the method includes: sending a collaborative positioning node list corresponding to the collaborative node to the to-be-positioned node, where information about another collaborative node used for assisting the collaborative node in performing positioning on the to-be-positioned node is recorded in the collaborative positioning node list; and when a quantity of same collaborative nodes between the collaborative positioning node list corresponding to the collaborative node and a target list corresponding to the to-be-positioned node is greater than a quantity of same collaborative nodes between a collaborative positioning node list corresponding to another collaborative node and the target list, performing positioning on the to-be-positioned node by using each monitoring node and the collaborative node serving as an anchor node, where each monitoring node is each of same collaborative nodes between the collaborative positioning node list corresponding to the anchor node and the target list, and node information of a collaborative node that can directly communicate with the to-be-positioned node is recorded in the target list corresponding to the to-be-positioned node. In this way, in a positioning process, a quantity of monitoring nodes is greater than a quantity of monitoring nodes corresponding to another anchor node. In same wireless communication coverage, a larger quantity of monitoring nodes leads to a higher possibility of discovering a hidden terminal among the monitoring nodes, so that a probability that the hidden terminal threatens the anchor node is reduced. In addition, when there are a larger quantity of monitoring nodes, more timestamp information is provided for performing positioning on the to-be-positioned node, thereby improving positioning accuracy of the to-be-positioned node to some extent.

A fourth aspect of this application provides a collaborative node, where the collaborative node is a collaborative node communicating with a to-be-positioned node, and the collaborative node includes: a sending unit, configured to send a collaborative positioning node list corresponding to the collaborative node to the to-be-positioned node, where information about another collaborative node used for assisting the collaborative node in performing positioning on the to-be-positioned node is recorded in the collaborative positioning node list; and a positioning unit, configured to: when a quantity of same collaborative nodes between the collaborative positioning node list corresponding to the collaborative node and a target list corresponding to the to-be-positioned node is greater than a quantity of same collaborative nodes between a collaborative positioning node list corresponding to another collaborative node and the target list, perform positioning on the to-be-positioned node by using each monitoring node and the collaborative node serving as an anchor node, where each monitoring node is each of same collaborative nodes between the collaborative positioning node list corresponding to the anchor node and the target list, and node information of a collaborative node that can directly communicate with the to-be-positioned node is recorded in the target list corresponding to the to-be-positioned node. In this way, in a positioning process, a quantity of monitoring nodes is greater than a quantity of monitoring nodes corresponding to another anchor node. In same wireless communication coverage, a larger quantity of monitoring nodes leads to a higher possibility of discovering a hidden terminal among the monitoring nodes, so that a probability that the hidden terminal threatens the anchor node is reduced. In addition, when there are a larger quantity of monitoring nodes, more timestamp information is provided for performing positioning on the to-be-positioned node, thereby improving positioning accuracy of the to-be-positioned node to some extent.

In an implementation, the sending a collaborative positioning node list corresponding to the collaborative node to the to-be-positioned node includes: sending a collaborative positioning response message to the to-be-positioned node after a collaborative positioning request sent by the to-be-positioned node in a broadcast mode is received, where the collaborative positioning response message carries at least the collaborative positioning node list and position information of the collaborative node; or the sending a collaborative positioning node list corresponding to the collaborative node to the to-be-positioned node includes: pushing a message to the to-be-positioned node, where the message carries the collaborative positioning node list corresponding to the collaborative node, so that after the collaborative positioning node list corresponding to each collaborative node is updated, an updated collaborative positioning node list can be obtained in a timely manner.

In an implementation, the method further includes: updating the collaborative positioning node list corresponding to the collaborative node, to ensure normal communication between nodes.

In an implementation, the performing positioning on the to-be-positioned node by using each monitoring node and the collaborative node serving as an anchor node includes: sending a monitoring instruction to each monitoring node, to trigger each monitoring node to obtain a receiving moment at which a fine timing measurement action frame is received, and to obtain a receiving moment at which a fine timing measurement response frame is received; obtaining position information of the anchor node, a sending moment at which the anchor node sends the fine timing measurement action frame, and a second receiving moment at which the anchor node receives the fine timing measurement response frame; and sending the position information of the anchor node, the sending moment at which the anchor node sends the fine timing measurement action frame, and the second receiving moment at which the anchor node receives the fine timing measurement response frame, to eliminate an error caused when synchronization cannot be implemented between internal clocks of the to-be-positioned node, the anchor node, and each monitoring node, so as to improve calculation accuracy.

A fifth aspect of this application provides a to-be-positioned node, including a communications component, a memory, and a processor, where the processor is configured to execute the positioning method according to the first aspect and all the foregoing implementations applied to the to-be-positioned node.

A sixth aspect of this application provides a storage medium, where the storage medium stores program code used for executing the positioning method according to the first aspect and all the foregoing implementations applied to a to-be-positioned node.

A seventh aspect of this application provides a collaborative node, including a communications component, a memory, and a processor, where the processor is configured to execute the positioning method according to the third aspect and all the foregoing implementations applied to the collaborative node.

An eighth aspect of this application provides a storage medium, where the storage medium stores program code used for executing the positioning method according to the third aspect and all the foregoing implementations applied to a to-be-positioned node.

BRIEF DESCRIPTION OF DRAWINGS

To describe the technical solutions in the embodiments of this application or in the prior art more clearly, the following briefly introduces the accompanying drawings required for describing the embodiments or the prior art. The accompanying drawings in the following description show some embodiments of this application, and a person of ordinary skill in the art may still derive other drawings from these accompanying drawings without creative efforts.

DESCRIPTION OF EMBODIMENTS

Figure 1:
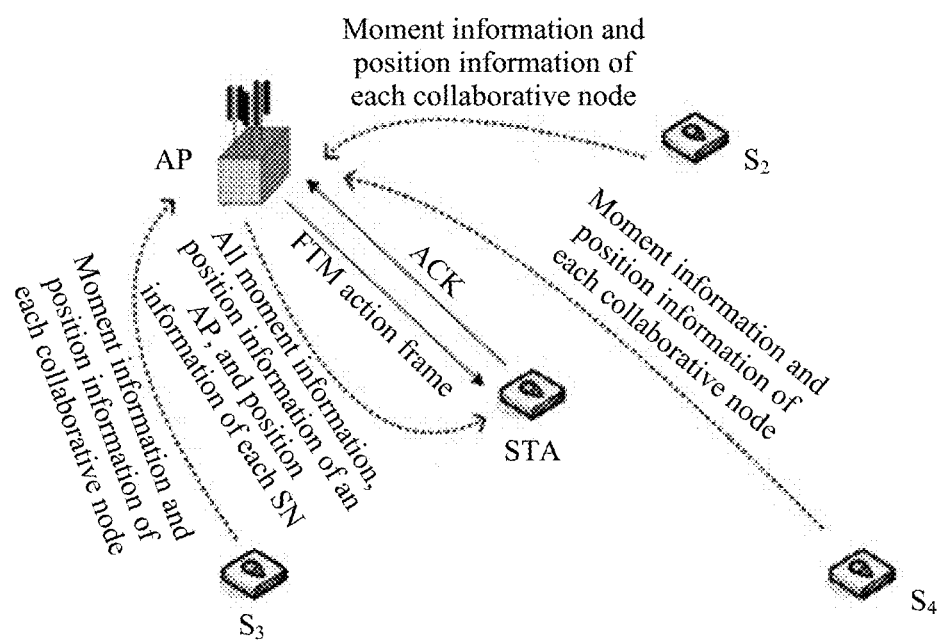
FIG. 1 is a schematic diagram of a collaborative positioning framework.

In a collaborative positioning framework, shown in FIG. 1, based on fine timing measurement (FTM) communication between an access point (AP) and a station (STA), a collaborative node Sn performs monitoring on FTM measurement between the STA as a to-be-positioned node and the AP as an anchor node. Specifically, the FTM measurement between the to-be-positioned node STA and the anchor node AP includes: The AP sends an FTM action frame to the STA, and the STA feeds back an acknowledgement (ACK) frame to the AP after receiving the FTM action frame.

Figure 2:
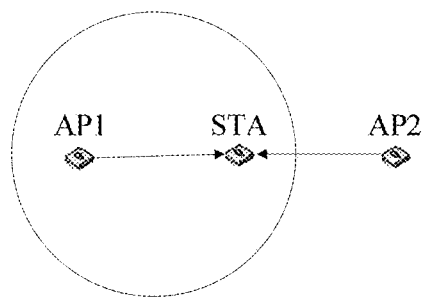
FIG. 2 is a schematic diagram of an AP becoming a hidden terminal.

However, in the wireless communications field, wireless communication coverage of each AP is limited, resulting in a conflict of information sent by a plurality of APs to the STA, as shown in FIG. 2. An area shown by a circle in FIG. 2 is wireless communication coverage of one AP (denoted as AP1), and another AP (denoted as AP2) is located outside the wireless communication coverage of the AP1. In this case, when the AP1 sends an FTM action frame to the STA, the AP2 cannot detect when the AP1 sends the FTM action frame to the STA, and the AP2 becomes a hidden terminal for the AP1. As a result, the AP1 and the AP2 may simultaneously send an FTM action frame to the STA. As a result, an information conflict is caused, and finally all information sent to the STA is lost. Therefore, how to reduce a probability of a threat from a hidden terminal is a technical problem to be resolved urgently.

Figure 3A:
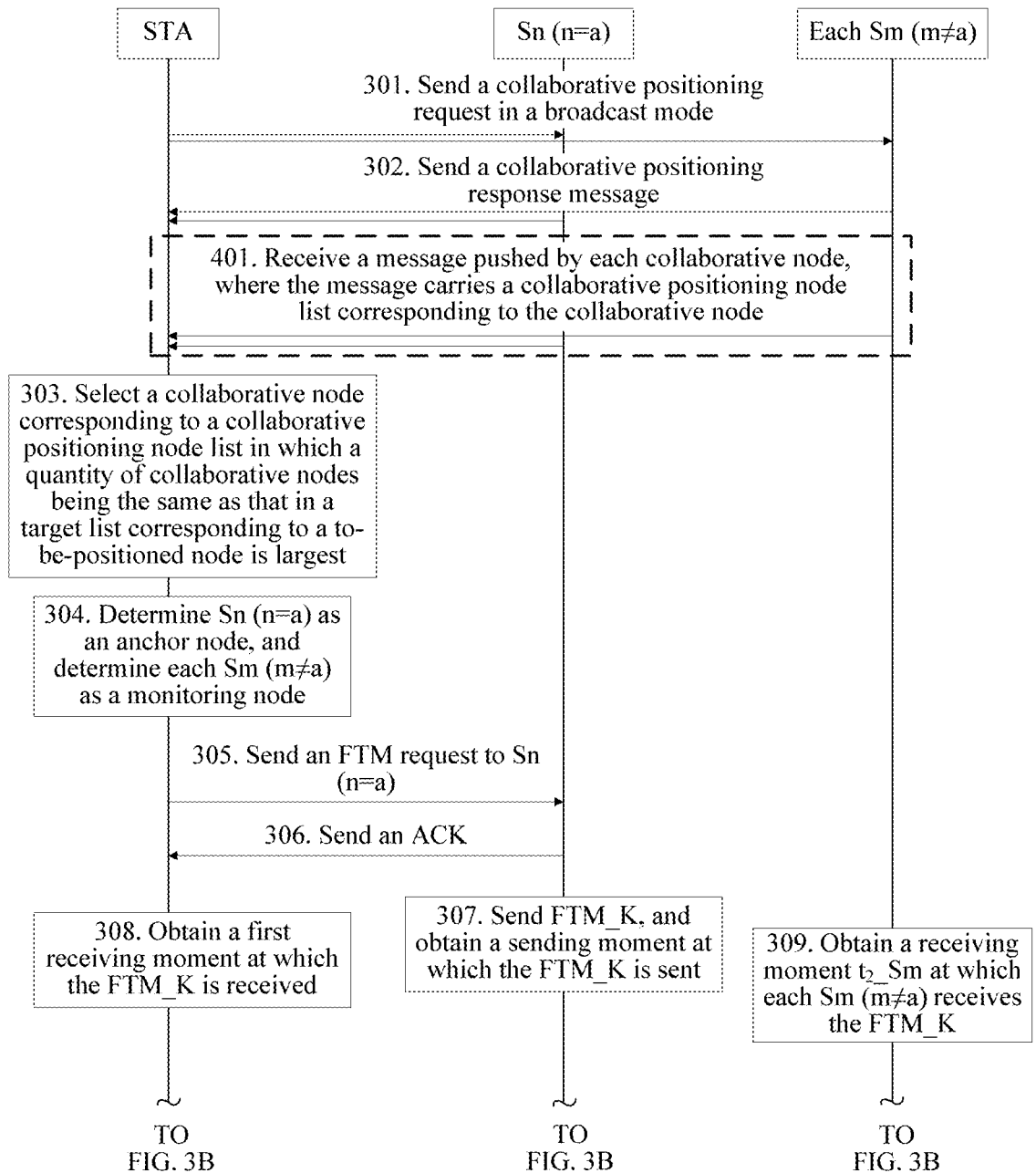
FIG. 3A and FIG. 3B are a flowchart of a collaborative node-based positioning method according to an embodiment of this application.
Figure 3B:
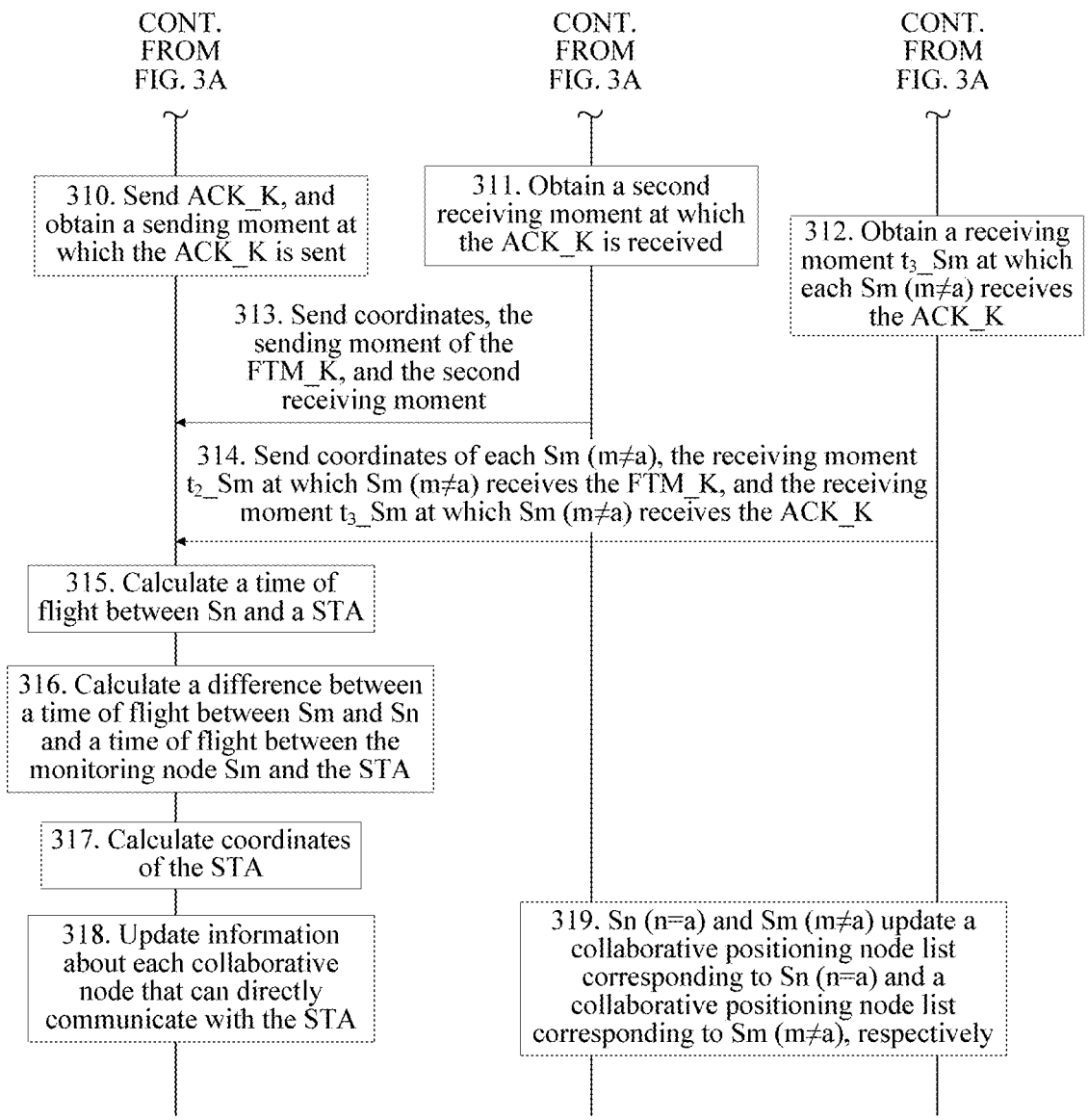

FIG. 3A and FIG. 3B are a flowchart of a collaborative node-based positioning method according to an embodiment of this application. The method is applied to the to-be-positioned node STA and a collaborative node Sn shown in FIG. 2 and FIG. 1, so as to reduce a probability of a threat from a hidden terminal. To determine position information of the to-be-positioned node STA, the STA, an anchor node, and a collaborative node perform the following operations.

301. The STA sends a collaborative positioning request in a broadcast mode, where the collaborative positioning request is used to obtain a collaborative positioning node list. The STA uses a collaborative positioning request identifier to indicate that the sent request is a collaborative positioning request, and no special limitation is made for information carried in the collaborative positioning request.

302. The collaborative node, that is, a collaborative node that receives the collaborative positioning request and that can participate in collaborative positioning, such as a collaborative node Sn (n=a) or Sm (m≠a) in FIG. 3A, sends a collaborative positioning response message to the STA, where the collaborative positioning response message carries a collaborative positioning node list corresponding to the collaborative node and position information of the collaborative node, and information about a node that directly communicates with the collaborative node corresponding to the collaborative positioning node list is recorded in the collaborative positioning node list. The collaborative node that receives the collaborative positioning request and that can participate in collaborative positioning is a collaborative node that can directly communicate with the STA, that is, a collaborative node can directly communicate with the STA without relay by another node.

The STA obtains, by performing the foregoing operations 301 and 302, a collaborative positioning node list corresponding to each collaborative node that can directly communicate with the STA. Certainly, the STA may obtain, in another manner the collaborative positioning node list corresponding to each collaborative node, for example, performing operation 401 shown in FIG. 3A: receive a message pushed by each collaborative node, where the message carries the collaborative positioning node list corresponding to the collaborative node.

303. The STA selects, according to the collaborative positioning node list corresponding to each collaborative node, a collaborative node corresponding to a collaborative positioning node list in which a quantity of collaborative nodes being the same as that in a target list corresponding to the to-be-positioned node is largest, for example, in FIG. 3A, a quantity of collaborative nodes, in a collaborative positioning node list corresponding to the collaborative node Sn (n=a), the same as that in the target list is largest. Node information of the collaborative node that can directly communicate with the STA is recorded in the target list.

304. The STA determines the selected collaborative node as an anchor node of the STA, and determines each of same collaborative nodes between the collaborative positioning node list corresponding to the anchor node and the target list as a monitoring node, for example, determines the collaborative node Sn (n=a) as the anchor node, and determines each collaborative node Sm (m≠a) of same collaborative nodes between the collaborative positioning node list corresponding to the anchor node and the target list, as the monitoring node.

305. The STA sends an FTM request to Sn (n=a).

306. Sn (n=a) sends an ACK, to instruct to perform positioning on the STA. After receiving the ACK, each monitoring node Sm (m≠a) of Sn (n=a) may monitor, when positioning is performed on the STA, FTM_K and ACK_K exchanged between the STA and Sn (n=a). That is, the ACK sent by Sn (n=a) after Sn (n=a) receives the FTM request may be used as an implementation for triggering a monitoring instruction that instructs the monitoring node to perform monitoring. The FTM_K represents that Sn (n=a) sends an FTM action frame for a $k^{th}$ time, and the ACK_K represents that the STA sends the ACK for the $k^{th}$ time.

307. Sn (n=a) sends the FTM_K, and obtains a sending moment $t_1$ of the FTM_K.

308. The STA obtains a first receiving moment $t_2$ at which the FTM_K is received.

309. Each Sm (n≠a) obtains a receiving moment $t_2\_Sm$ at which Sm (m≠a) receives the FTM_K.

310. The STA sends the ACK_K and obtains a sending moment $t_3$ of the ACK_K, where the ACK_K is an implementation of a fine timing measurement response frame.

311. Sn (n=a) obtains a second receiving moment $t_4$ at which the ACK_K is received.

312. Each Sm (m≠a) obtains a receiving moment $t_3\_Sm$ at which Sm (m≠a) receives the ACK_K.

313. Sn (n=a) obtains coordinates of Sn (n=a), and sends the coordinates of Sn (n=a), the sending moment $t_3$ of the ACK_K, and the first receiving moment $t_2$ to the STA.

314. Each Sm (m≠a) obtains coordinates corresponding to Sm (m≠a), and sends, to the STA, the coordinates corresponding to Sm (m≠a), the receiving moment $t_2\_Sm$ at which Sm (m≠a) receives the FTM_K, and the receiving moment $t_3\_Sm$ at which Sm (m≠a) receives the ACK_K.

315. The STA calculates a time of flight (TOF) between Sn and the STA (Sn-STA) according to the following Formula 1:

$$TOF(Sn-STA)=((t_4-t_1)-(t_3-t_2))/2 \quad \text{(Formula 1)}.$$

316. The STA calculates a difference between a time of flight between the monitoring node Sm and Sn and a time of flight between the monitoring node Sm and the STA according to Formula 2:

$$TOF(STA-Sm)-TOF(Sn-Sm)=t_3\_Sm-t_2\_SM+(t_2-t_3)-TOF(Sn-STA) \quad \text{(Formula 2)}.$$

317. The STA calculates coordinates of the STA according to Formula 3:

$$\sqrt{(x-a_m)^2+(y-b_m)^2}-\sqrt{(a_n-x)^2+(b_n-y)^2}=(TOF(STA-Sm)-TOF(Sn-Sm))*c \quad \text{(Formula 3)},$$

where (x,y) represents the coordinates of the STA, $(a_n,b_n)$ represents the coordinates of the anchor node Sn, $(a_m,b_m)$ represents the coordinates of the monitoring node Sm, c is a speed of light, and c is equal to $3*10^8$. It can be learned from Formula 1, Formula 2, and Formula 3 that, in Formula 3, a right side of an equation of Formula 3 may be obtained by multiplying the foregoing moments and the speed of light, and Formula 3 includes two unknown quantities, x and y. Therefore, at least two equations are required, that is, at least one anchor node and one monitoring node are required to calculate the coordinates of the STA. In this embodiment of this application, position information of each node is represented by coordinates.

It should be noted herein that the STA, Sn (n=a), and Sm (m≠a) each need to update information about a collaborative node that can perform communication, and an objective of updating the information is to determine whether the corresponding collaborative node can still perform communication, so as to ensure normal communication between nodes.

318. The STA updates information about each collaborative node that can directly communicate with the STA.

319. Sn (n=a) and Sm (m≠a) update the collaborative positioning node list corresponding to Sn (n=a) and a collaborative positioning node list corresponding to Sm (m≠a), respectively, so as to update information about each collaborative node in the collaborative positioning node lists.

In this embodiment of this application, how to perform updating is determined according to a usage time of the collaborative node. For example, a timestamp is added into the information about the collaborative node, and the timestamp is used to indicate the usage time of the collaborative node; when the usage time indicated by the timestamp is in a current time, a corresponding collaborative node is added; when the usage time indicated by the timestamp is not in the current time, the corresponding collaborative node is deleted. Alternatively, a timer is set for each collaborative node, and the corresponding collaborative node is deleted if the timer expires. Alternatively, if the usage time of the collaborative node is known when the information about the collaborative node is obtained, when the usage time is in a current time, a corresponding collaborative node is added; when the usage time is not in the current time, the corresponding collaborative node is deleted.

It can be learned from a process shown in FIGS. 3A and 3B that, in this embodiment of this application, the collaborative positioning node list corresponding to each collaborative node that can directly communicate with the to-be-positioned node is obtained, and the collaborative node corresponding to the collaborative positioning node list in which the quantity of collaborative nodes being the same as that in the target list corresponding to the to-be-positioned node is largest is selected according to the collaborative positioning node list corresponding to each collaborative node; and positioning is performed on the to-be-positioned node by using the anchor node and each monitoring node, where the anchor node is the selected collaborative node, and each monitoring node is each of same collaborative nodes between the collaborative positioning node list corresponding to the anchor node and the target list, so that in a positioning process, a quantity of monitoring nodes is greater than a quantity of monitoring nodes corresponding to another anchor node. In same wireless communication coverage, a larger quantity of monitoring nodes leads to a higher possibility of discovering a hidden terminal among the monitoring nodes, so that a probability that the hidden terminal threatens the anchor node is reduced. In addition, when there are a larger quantity of monitoring nodes, more timestamp information is provided for performing positioning on the to-be-positioned node, thereby improving positioning accuracy of the to-be-positioned node to some extent.

The following describes, by using three application scenarios, how to select a collaborative node to reduce a probability of a threat from a hidden terminal.

Figure 4:
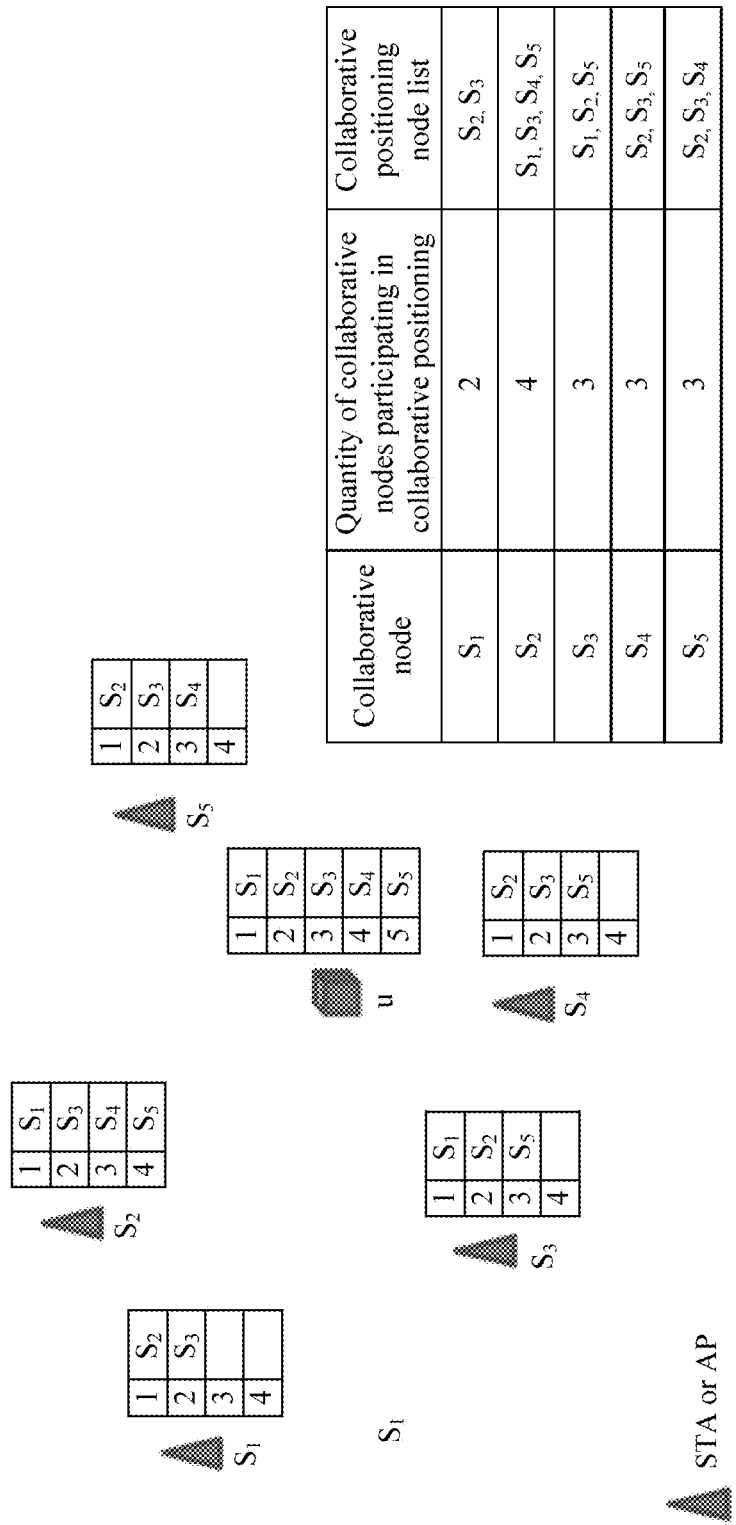
FIG. 4 is a schematic diagram of an application scenario according to an embodiment of this application.

In one application scenario, when types of collaborative nodes are the same and all the collaborative nodes are APs or STAs, as shown in FIG. 4, u is a to-be-positioned node, $S_1$ to $S_5$ are collaborative nodes with which u can directly communicate, and a collaborative positioning node list corresponding to each collaborative node records different collaborative nodes that can participate in collaborative positioning. For example, collaborative nodes, of $S_1$, that can participate in collaborative positioning include $S_2$ and $S_3$, and collaborative nodes, of $S_4$, that can participate in collaborative positioning include $S_2$, $S_3$, and $S_5$. The to-be-positioned node u selects, from the collaborative nodes $S_1$ to $S_5$, a collaborative node corresponding to a collaborative positioning node list in which a quantity of collaborative nodes being the same as that in a target list corresponding to u is largest, as an anchor node; and the collaborative node is $S_2$ in this embodiment of this application. An intersection between the target list U ($S_1$, $S_2$, $S_3$, $S_4$, $S_5$) corresponding to u and the collaborative positioning node list $S_2$ ($S_1$, $S_3$, $S_4$, $S_5$) corresponding to $S_2$ is ($S_1$, $S_3$, $S_4$, $S_5$), and in the collaborative positioning node list $S_2$ ($S_1$, $S_3$, $S_4$, $S_5$), the quantity of the collaborative nodes being the same as that in the target list U is largest. This means that when $S_2$ is the anchor node, there are four monitoring nodes ($S_1$, $S_3$, $S_4$, $S_5$) participating in FTM measurement. In this case, compared with a case in which another collaborative node is used as the anchor node, a quantity of the collaborative nodes participating in collaborative positioning is largest, so that the probability of the threat from the hidden terminal is reduced.

Figure 5:
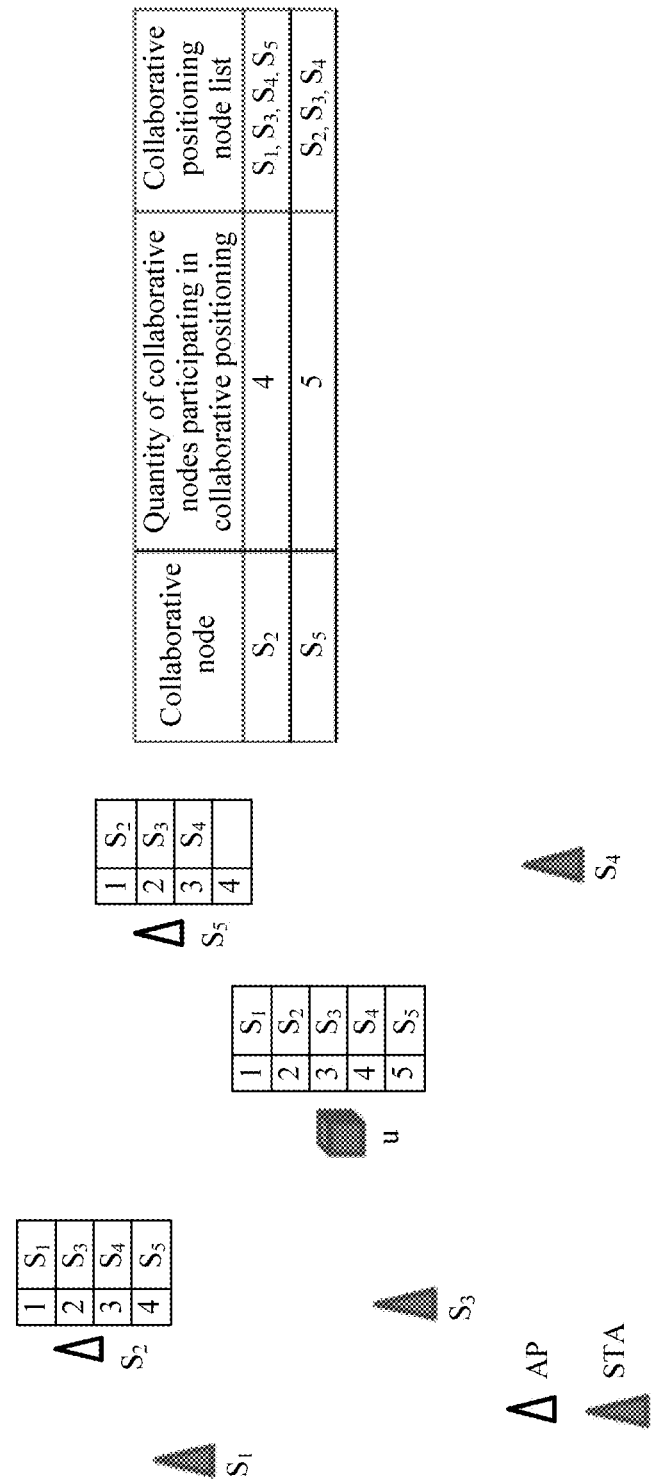
FIG. 5 is a schematic diagram of another application scenario according to an embodiment of this application.

In another application scenario, when types of collaborative nodes are different and a plurality of collaborative nodes include APs and STAs, only the APs share collaborative positioning node lists corresponding to the APs. As shown in FIG. 5, u is a to-be-positioned node, $S_2$ and $S_5$ are collaborative nodes with which u can directly communicate, a collaborative positioning node list corresponding to each collaborative node records different collaborative nodes that can participate in collaborative positioning. For example, collaborative nodes, of $S_2$, that can participate in collaborative positioning include $S_1$, $S_3$, $S_4$, and $S_5$, and collaborative nodes, of $S_5$, that can participate in collaborative positioning include $S_2$, $S_3$, and $S_4$. u selects, from the collaborative nodes $S_2$ and $S_5$, a collaborative node corresponding to a collaborative positioning node list in which a quantity of collaborative nodes being the same as that in a target list corresponding to u is largest, as an anchor node, and the collaborative node is $S_2$ in this embodiment of this application. An intersection between the target list U ($S_1$, $S_2$, $S_3$, $S_4$, $S_5$) corresponding to u and the collaborative positioning node list $S_2$ ($S_1$, $S_3$, $S_4$, $S_5$) corresponding to $S_2$ is ($S_1$, $S_3$, $S_4$, $S_5$), and in the collaborative positioning node list $S_2$ ($S_1$, $S_3$, $S_4$, $S_5$), the quantity of the collaborative nodes being the same as that in the target list U is largest. This means that when $S_2$ is the anchor node, there are four monitoring nodes ($S_1$, $S_3$, $S_4$, $S_5$) participating in FTM measurement. In this case, the quantity of the collaborative nodes participating in collaborative positioning is largest, so that the probability of the threat from the hidden terminal is reduced.

Figure 6:
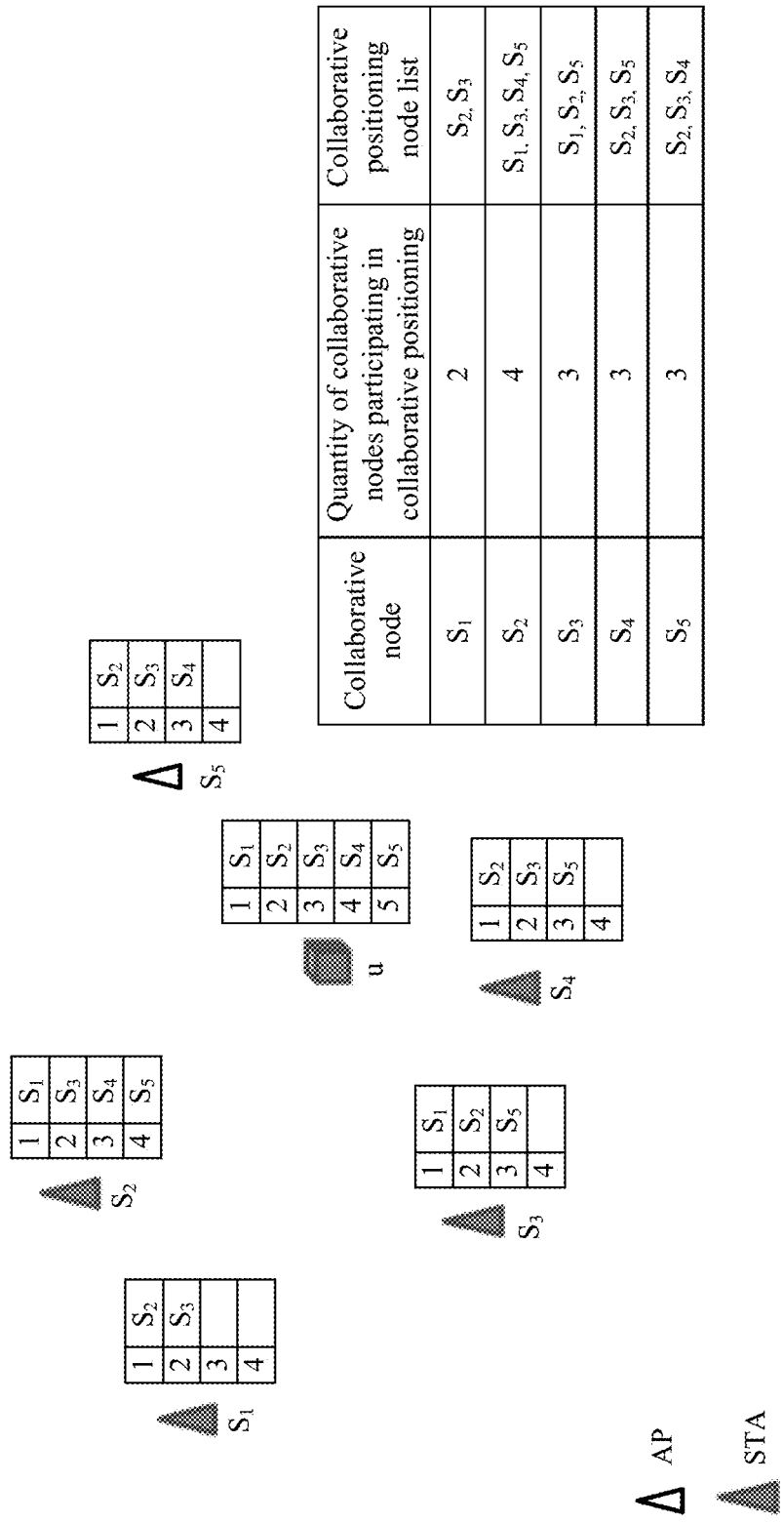
FIG. 6 is a schematic diagram of still another application scenario according to an embodiment of this application.

In still another application scenario, when types of collaborative nodes are different and a plurality of collaborative nodes include one AP and STAs, it is required that the AP and the STA share a collaborative positioning node list corresponding to the AP and a collaborative positioning node list corresponding to the STA, respectively. As shown in FIG. 6, u is a to-be-positioned node, $S_1$ to $S_5$ are collaborative nodes with which u can directly communicate, a collaborative positioning node list corresponding to each collaborative node records different collaborative nodes that can participate in collaborative positioning. For example, collaborative nodes, of $S_1$, that can participate in collaborative positioning include $S_2$ and $S_3$, and collaborative nodes, of $S_4$, that can participate in collaborative positioning include $S_2$, $S_3$, and $S_5$. u selects, from the collaborative nodes $S_1$ to $S_5$, a collaborative node corresponding to a collaborative positioning node list in which a quantity of collaborative nodes being the same as that in a target list corresponding to u is largest, as an anchor node, and the collaborative node is $S_2$ in this embodiment of this application. An intersection between the target list U ($S_1$, $S_2$, $S_3$, $S_4$, $S_5$) corresponding to u and the collaborative positioning node list $S_2$ ($S_1$, $S_3$, $S_4$, $S_5$) corresponding to $S_2$ is ($S_1$, $S_3$, $S_4$, $S_5$), and in the collaborative positioning node list $S_2$ ($S_1$, $S_3$, $S_4$, $S_5$), the quantity of the collaborative nodes being the same as that in the target list U is largest. This means that when $S_2$ is the anchor node, there are four monitoring nodes ($S_1$, $S_3$, $S_4$, $S_5$) participating in FTM measurement. In this case, the quantity of the collaborative nodes participating in collaborative positioning is largest, so that the probability of the threat from the hidden terminal is reduced.

It can be learned from the foregoing three scenarios that feasible manners of selecting a collaborative node include but are not limited to the following two manners:

In one manner, identification information of all collaborative nodes in collaborative positioning node lists corresponding to these five collaborative nodes $S_1$ to $S_5$ is sequentially compared with identification information of all the collaborative nodes in the target list corresponding to u, and it is discovered that, in the collaborative positioning node lists corresponding to the five collaborative nodes $S_1$ to $S_5$, quantities of collaborative nodes whose identification information is the same as that of collaborative nodes in the target list are 2, 4, 3, 3, and 3, respectively. In this case, the collaborative node $S_2$ corresponding to the quantity 4 may be selected as the anchor node.

In another manner, quantities of collaborative nodes included in collaborative positioning node lists corresponding to the collaborative nodes $S_1$ to $S_5$ are 2, 4, 3, 3, and 3, respectively. According to a comparison order: $S_2$ to $S_5$ and $S_1$, identification information of each collaborative node in the collaborative positioning node list corresponding to $S_2$ is first compared with identification information of each collaborative node in the target list corresponding to u, and it is discovered that, in $S_2$, a quantity of collaborative nodes whose identification information is the same as that of collaborative nodes in the target list corresponding to u is 4, and this quantity is significantly greater than quantities of collaborative nodes included in the collaborative positioning node lists corresponding to $S_3$ to $S_5$ and $S_1$. In this case, the collaborative node $S_2$ may be selected as the anchor node.

According to the method provided in this embodiment of this application, three to-be-positioned nodes whose received signal strength indicator (RSSI) is largest are selected to perform ranging. On a winprol simulation platform, positioning testing is performed based on the foregoing three application scenarios, and an algorithm used for the positioning testing is a triangulation ranging+centroid positioning algorithm. Positioning results are shown in Table 1, and it can be discovered that when the collaborative node $S_2$ is selected as the anchor node, a positioning error is minimum.

TABLE 1

Positioning results

| Collaborative node | Quantity of collaborative nodes participating in collaborative positioning | Collaborative positioning node list | Error/m (meter) |
| --- | --- | --- | --- |
| $S_1$ | 2 | $S_2, S_3$ | 5.88 |
| $S_2$ | 4 | $S_1, S_3, S_4, S_5$ | 1.39 |
| $S_3$ | 3 | $S_1, S_2, S_5$ | 3.2 |
| $S_4$ | 3 | $S_2, S_3, S_5$ | 3.2 |
| $S_5$ | 3 | $S_2, S_3, S_4$ | 3.2 |

Figure 7:
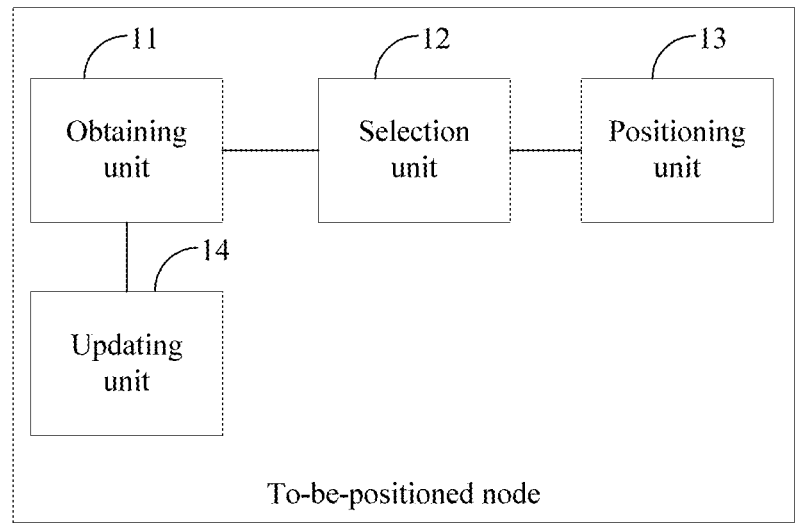
FIG. 7 is a schematic structural diagram of a to-be-positioned node according to an embodiment of this application.

Referring to FIG. 7, FIG. 7 shows a structure of the to-be-positioned node shown in FIGS. 3A and 3B according to an embodiment of this application. The to-be-positioned node may include an obtaining unit 11, a selection unit 12, a positioning unit 13, and an updating unit 14.

The obtaining unit 11 is configured to obtain a collaborative positioning node list corresponding to each collaborative node that can directly communicate with the to-be-positioned node, where information about a node that can perform collaborative positioning and that exists in a direct communication coverage of the collaborative node corresponding to the collaborative positioning node list is recorded in the collaborative positioning node list.

In this embodiment of this application, an implementation for obtaining, by the obtaining unit 11, a collaborative positioning node list corresponding to each collaborative node that can directly communicate with the to-be-positioned node is: The obtaining unit 11 is configured to receive a message pushed by each collaborative node, where the message carries the collaborative positioning node list corresponding to the collaborative node.

Figure 8:
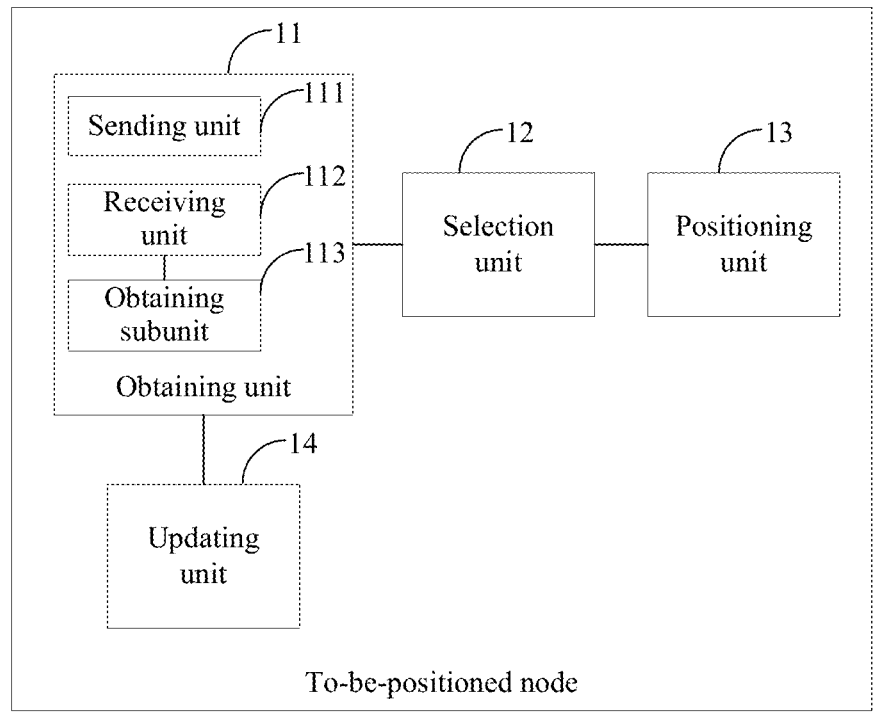
FIG. 8 is another schematic structural diagram of a to-be-positioned node according to an embodiment of this application.

Alternatively, the obtaining unit 11 may obtain, by using a structure shown in FIG. 8, the collaborative positioning node list corresponding to each collaborative node that can directly communicate with the to-be-positioned node. The obtaining unit 11 includes a sending unit 111, a receiving unit 112, and an obtaining subunit 113.

The sending unit 112 is configured to send a collaborative positioning request in a broadcast mode, where the collaborative positioning request is used to obtain a collaborative positioning node list.

The receiving unit 113 is configured to receive a collaborative positioning response message sent by each collaborative node that can directly communicate with the to-be-positioned node, where the collaborative positioning response message carries at least the collaborative positioning node list or position information of the collaborative node.

The obtaining subunit 114 is configured to obtain, from the collaborative positioning response message sent by each collaborative node, the collaborative positioning node list corresponding to each collaborative node.

The selection unit 12 is configured to select, according to the collaborative positioning node list corresponding to each collaborative node, a collaborative node corresponding to a collaborative positioning node list in which a quantity of collaborative nodes being the same as that in a target list corresponding to the to-be-positioned node is largest, where node information of a collaborative node that can directly communicate with the to-be-positioned node is recorded in the target list corresponding to the to-be-positioned node.

The positioning unit 13 is configured to perform positioning on the to-be-positioned node by using an anchor node and each monitoring node, where the anchor node is the selected collaborative node, and each monitoring node is each of same collaborative nodes between the collaborative positioning node list corresponding to the anchor node and the target list. Positioning performed by the positioning unit 14 on the to-be-positioned node may a process of calculating position information, such as coordinates, of the to-be-positioned node. For details, refer to related descriptions in the method embodiment, and the details are not described again in this embodiment of the present disclosure.

The updating unit 14 is configured to update information about each collaborative node that can directly communicate with the to-be-positioned node.

According to the foregoing technical solution, the collaborative positioning node list corresponding to each collaborative node that can directly communicate with the to-be-positioned node is obtained, and the collaborative node corresponding to the collaborative positioning node list in which the quantity of collaborative nodes being the same as that in the target list corresponding to the to-be-positioned node is largest is selected according to the collaborative positioning node list corresponding to each collaborative node; and positioning is performed on the to-be-positioned node by using the anchor node and each monitoring node, where the anchor node is the selected collaborative node, and each monitoring node is each of same collaborative nodes between the collaborative positioning node list corresponding to the anchor node and the target list. In this way, in a positioning process, a quantity of monitoring nodes is greater than a quantity of monitoring nodes corresponding to another anchor node. In same wireless communication coverage, a larger quantity of monitoring nodes leads to a higher possibility of discovering a hidden terminal among the monitoring nodes, so that a probability that the hidden terminal threatens the anchor node is reduced. In addition, when there are a larger quantity of monitoring nodes, more timestamp information is provided for performing positioning on the to-be-positioned node, thereby improving positioning accuracy of the to-be-positioned node to some extent.

Figure 9:
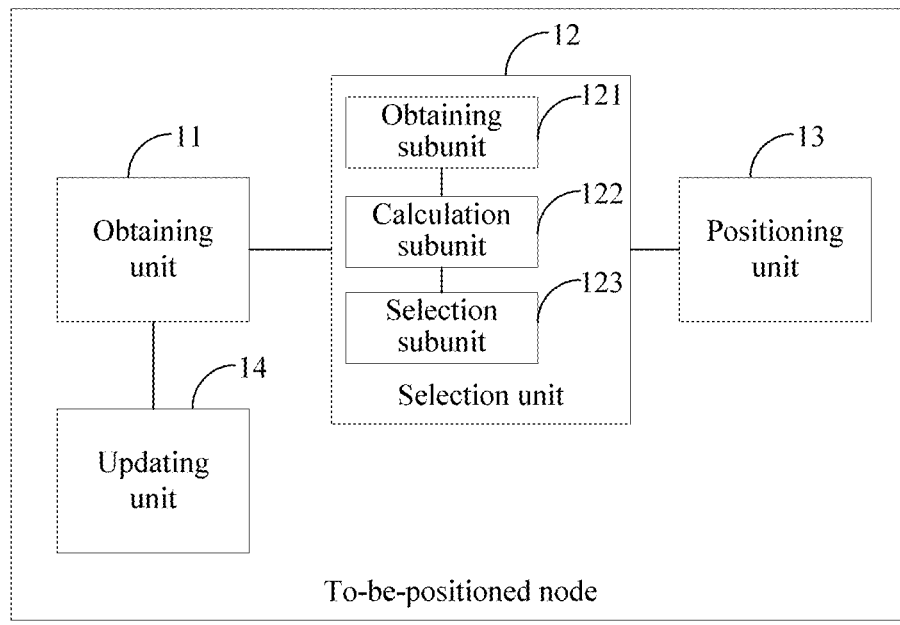
FIG. 9 is still another schematic structural diagram of a to-be-positioned node according to an embodiment of this application.

In this embodiment of this application, an implementation for selecting a collaborative node by the selection unit 12 includes but is not limited to the following two implementations. In one implementation:

The selection unit 12 includes an obtaining subunit 121, a calculation subunit 122, and a selection subunit 123, as shown in FIG. 9.

The obtaining subunit 121 is configured to sequentially compare identification information of all the collaborative nodes in the collaborative positioning node lists with identification information of each collaborative node in the target list corresponding to the to-be-positioned node, to obtain a collaborative node whose identification information is the same as that of each collaborative node in the target list.

The calculation subunit 122 is configured to calculate a quantity of collaborative nodes, in each collaborative positioning node list, whose identification information is the same as that of each collaborative node in the target list.

The selection subunit 123 is configured to select a collaborative node corresponding to a collaborative positioning node list in which a quantity of collaborative nodes whose identification information is the same as that of each collaborative node in the target list is largest.

Figure 10:
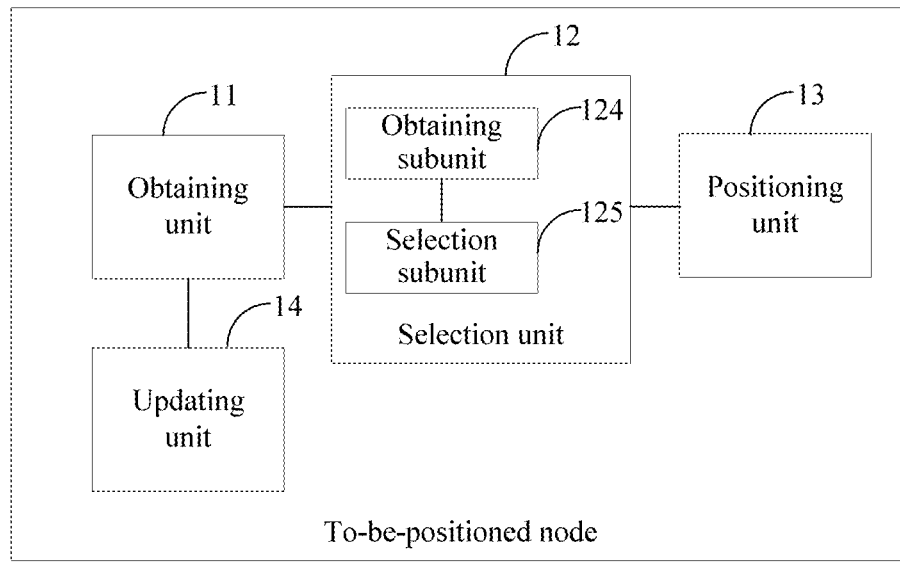
FIG. 10 is still another schematic structural diagram of a to-be-positioned node according to an embodiment of this application.

In the other implementation, the selection unit 12 includes an obtaining subunit 124 and a selection subunit 125, as shown in FIG. 10.

The obtaining subunit 124 is configured to obtain a quantity of collaborative nodes included in each collaborative positioning node list, and configured to, starting from a collaborative positioning node list including a largest quantity of collaborative nodes, compare identification information of each collaborative node in the collaborative positioning node list with identification information of each collaborative node in the target list corresponding to the to-be-positioned node, to obtain a collaborative node whose identification information is the same as that of each collaborative node in the target list.

The selection subunit 125 is configured to: when a quantity of collaborative nodes, in the collaborative positioning node list on which comparison is performed, whose identification information is the same as that of each collaborative node in the target list is greater than or equal to a quantity of collaborative nodes in a remaining collaborative positioning node list on which no comparison is performed, select a collaborative node corresponding to the collaborative positioning node list in which the quantity of collaborative nodes whose identification information is the same as that of each collaborative node in the target list is greater than or equal to the quantity of collaborative nodes in the remaining collaborative positioning node list.

Figure 11:
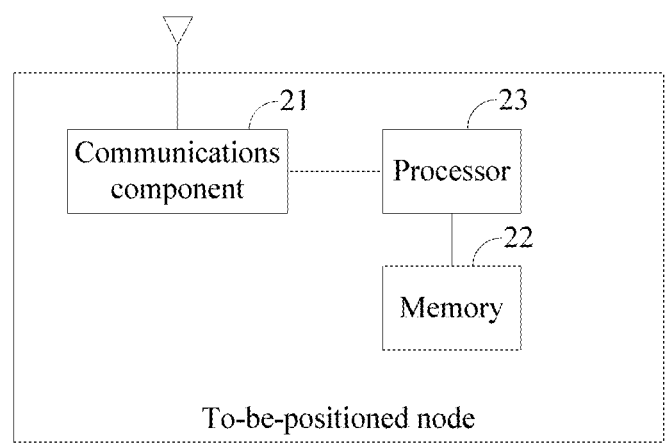
FIG. 11 is still another schematic structural diagram of a to-be-positioned node according to an embodiment of this application.

Referring to FIG. 11, FIG. 11 shows a structure of the to-be-positioned node shown in FIGS. 3A and 3B according to an embodiment of this application, where the to-be-positioned node may include a communications component 21, a memory 22, and a processor 23.

The processor 23 is configured to: obtain a collaborative positioning node list corresponding to each collaborative node that can directly communicate with the to-be-positioned node; select, according to the collaborative positioning node list corresponding to each collaborative node, a collaborative node corresponding to a collaborative positioning node list in which a quantity of collaborative nodes being the same as that in a target list corresponding to the to-be-positioned node is largest; and perform positioning on the to-be-positioned node by using an anchor node and each monitoring node, where the anchor node is the selected collaborative node, and each monitoring node is each of same collaborative nodes between the collaborative positioning node list corresponding to the anchor node and the target list.

Information about a node that can directly communicate with the collaborative node corresponding to the collaborative positioning node list is recorded in the collaborative positioning node list, and node information of a collaborative node that can directly communicate with the to-be-positioned node is recorded in the target list corresponding to the to-be-positioned node.

The memory 22 is configured to store the collaborative positioning node list corresponding to each collaborative node and the target list corresponding to the to-be-positioned node.

According to the foregoing technical solution, the collaborative positioning node list corresponding to each collaborative node that can directly communicate with the to-be-positioned node is obtained, and the collaborative node corresponding to the collaborative positioning node list in which the quantity of collaborative nodes being the same as that in the target list corresponding to the to-be-positioned node is largest is selected according to the collaborative positioning node list corresponding to each collaborative node; and positioning is performed on the to-be-positioned node by using the anchor node and each monitoring node, where the anchor node is the selected collaborative node, and each monitoring node is each of same collaborative nodes between the collaborative positioning node list corresponding to the anchor node and the target list. In this way, in a positioning process, a quantity of monitoring nodes is greater than a quantity of monitoring nodes corresponding to another anchor node. In same wireless communication coverage, a larger quantity of monitoring nodes leads to a higher possibility of discovering a hidden terminal among the monitoring nodes, so that a probability that the hidden terminal threatens the anchor node is reduced. In addition, when there are a larger quantity of monitoring nodes, more timestamp information is provided for performing positioning on the to-be-positioned node, thereby improving positioning accuracy of the to-be-positioned node to some extent.

In an implementation, the obtaining, by the processor 23, a collaborative positioning node list corresponding to each collaborative node that can directly communicate with the to-be-positioned node includes but is not limited to the following two implementations. One implementation is:

The processor 23 makes the communications component 21 send a collaborative positioning request in a broadcast mode, and makes the communications component 21 receive a collaborative positioning response message sent by each collaborative node that can directly communicate with the to-be-positioned node, where the collaborative positioning request is used to obtain a collaborative positioning node list, and the collaborative positioning response message carries at least the collaborative positioning node list and position information of the collaborative node.

The other implementation is: The processor 23 makes the communications component 21 receive a message pushed by each collaborative node, where the message carries the collaborative positioning node list corresponding to the collaborative node.

In an implementation, the selecting, by the processor 23 according to the collaborative positioning node list corresponding to each collaborative node, a collaborative node corresponding to a collaborative positioning node list in which a quantity of collaborative nodes being the same as that in a target list corresponding to the to-be-positioned node is largest includes but is not limited to the following two implementations. One implementation is:

The processor 23 sequentially compares identification information of all the collaborative nodes in the collaborative positioning node lists with identification information of each collaborative node in the target list corresponding to the to-be-positioned node, to obtain a collaborative node whose identification information is the same as that of each collaborative node in the target list;

calculates a quantity of collaborative nodes, in each collaborative positioning node list, whose identification information is the same as that of each collaborative node in the target list; and selects a collaborative node corresponding to a collaborative positioning node list in which a quantity of collaborative nodes whose identification information is the same as that of each collaborative node in the target list is largest.

The other implementation is: The processor 23 obtains a quantity of collaborative nodes included in each collaborative positioning node list;

starting from a collaborative positioning node list including a largest quantity of collaborative nodes, compares identification information of each collaborative node in the collaborative positioning node list with identification information of each collaborative node in the target list corresponding to the to-be-positioned node, to obtain a collaborative node whose identification information is the same as that of each collaborative node in the target list; and when a quantity of collaborative nodes, in the collaborative positioning node list on which comparison is performed, whose identification information is the same as that of each collaborative node in the target list is greater than or equal to a quantity of collaborative nodes in a remaining collaborative positioning node list on which no comparison is performed, selects a collaborative node corresponding to the collaborative positioning node list in which the quantity of collaborative nodes whose identification information is the same as that of each collaborative node in the target list is greater than or equal to the quantity of collaborative nodes in the remaining collaborative positioning node list.

In an implementation, the processor 23 is further configured to update information about each collaborative node that can directly communicate with the to-be-positioned node.

In an implementation, that the processor 23 performs positioning on the to-be-positioned node by using an anchor node and each monitoring node includes:

obtaining position information of the anchor node, a sending moment at which the anchor node sends a fine timing measurement action frame, and a second receiving moment at which the anchor node receives a fine timing measurement response frame;

obtaining a first receiving moment at which the to-be-positioned node receives the fine timing measurement action frame and a sending moment at which the to-be-positioned node sends the fine timing measurement response frame;

obtaining position information of each monitoring node, a receiving moment at which each monitoring node receives the fine timing measurement action frame, and a receiving moment at which each monitoring node receives the fine timing measurement response frame; and obtaining position information of the to-be-positioned node according to the position information of the anchor node, the sending moment at which the anchor node sends the fine timing measurement action frame, the second receiving moment at which the anchor node receives the fine timing measurement response frame, the first receiving moment at which the to-be-positioned node receives the fine timing measurement action frame, the sending moment at which the to-be-positioned node sends the fine timing measurement response frame, the position information of each monitoring node, the receiving moment at which each monitoring node receives the fine timing measurement action frame, and the receiving moment at which each monitoring node receives the fine timing measurement response frame, to eliminate an error caused when synchronization cannot be implemented between internal clocks of the to-be-positioned node, the anchor node, and each monitoring node, so as to improve calculation accuracy.

Figure 12:
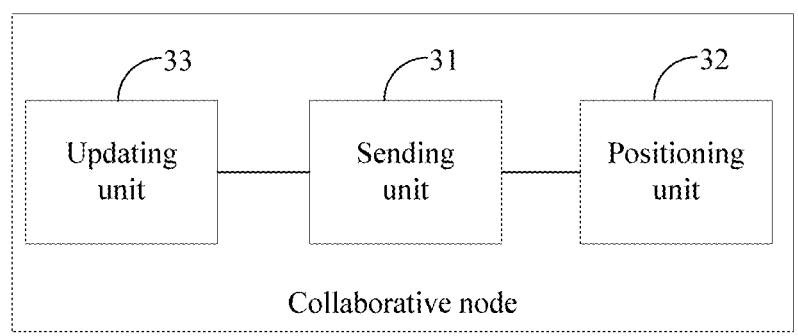
FIG. 12 is a schematic structural diagram of a collaborative node according to an embodiment of this application.

Referring to FIG. 12, FIG. 12 shows a structure of the collaborative node shown in FIGS. 3A and 3B according to an embodiment of this application, where the collaborative node is a collaborative node communicating with a to-be-positioned node, and the collaborative node may include a sending unit 31, a positioning unit 32, and an updating unit 33.

The sending unit 31 is configured to send a collaborative positioning node list corresponding to the collaborative node to the to-be-positioned node, where information about another collaborative node used for assisting the collaborative node in performing positioning on the to-be-positioned node is recorded in the collaborative positioning node list.

In this embodiment of this application, the sending, by the sending unit 31, a collaborative positioning node list corresponding to the collaborative node to the to-be-positioned node includes but is not limited to the following two implementations. One implementation is: The sending unit 31 pushes a message to the to-be-positioned node, where the message carries the collaborative positioning node list corresponding to the collaborative node.

Figure 13:
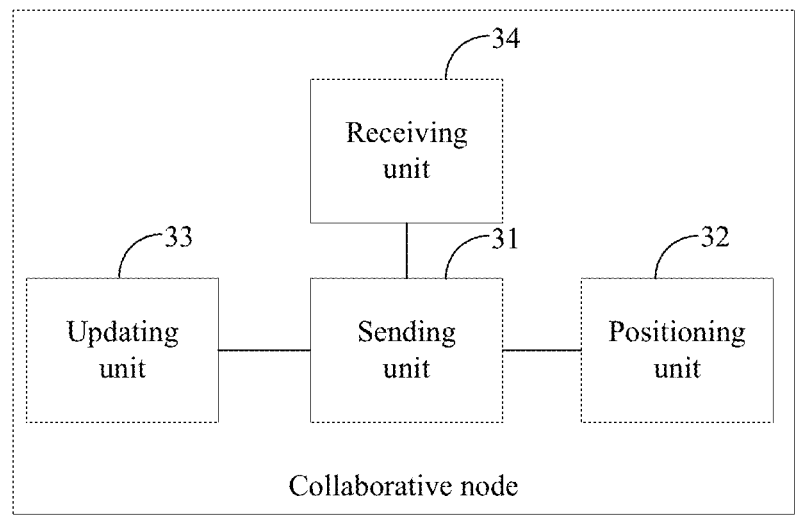
FIG. 13 is another schematic structural diagram of a collaborative node according to an embodiment of this application.

The other implementation is: The collaborative node further includes a receiving unit 34, as shown in FIG. 13. The receiving unit 34 is configured to receive a collaborative positioning request sent by the to-be-positioned node in a broadcast mode, where the collaborative positioning request is used to obtain a collaborative positioning node list.

The sending, by the sending unit 31, a collaborative positioning node list corresponding to the collaborative node to the to-be-positioned node includes: The sending unit 31 is configured to send a collaborative positioning response message to the to-be-positioned node after the receiving unit 34 receives the collaborative positioning request sent by the to-be-positioned node in the broadcast mode, where the collaborative positioning response message carries at least the collaborative positioning node list and position information of the collaborative node.

The positioning unit 32 is configured to: when a quantity of same collaborative nodes between the collaborative positioning node list corresponding to the collaborative node and a target list corresponding to the to-be-positioned node is greater than a quantity of same collaborative nodes between a collaborative positioning node list corresponding to another collaborative node and the target list, perform positioning on the to-be-positioned node by using each monitoring node and the collaborative node serving as an anchor node, where each monitoring node is each of same collaborative nodes between the collaborative positioning node list corresponding to the anchor node and the target list.

The updating unit 33 is configured to update the collaborative positioning node list corresponding to the collaborative node.

According to the foregoing technical solution, when the quantity of same collaborative nodes between the collaborative positioning node list corresponding to the collaborative node and the target list corresponding to the to-be-positioned node is greater than the quantity of same collaborative nodes between the collaborative positioning node list corresponding to the another collaborative node and the target list, positioning is performed on the to-be-positioned node by using each monitoring node and the collaborative node serving as an anchor node, where each monitoring node is each of same collaborative nodes between the collaborative positioning node list corresponding to the anchor node and the target list. In this way, in a positioning process, a quantity of monitoring nodes is greater than a quantity of monitoring nodes corresponding to another anchor node. In same wireless communication coverage, a larger quantity of monitoring nodes leads to a higher possibility of discovering a hidden terminal among the monitoring nodes, so that a probability that the hidden terminal threatens the anchor node is reduced. In addition, when there are a larger quantity of monitoring nodes, more timestamp information is provided for performing positioning on the to-be-positioned node, thereby improving positioning accuracy of the to-be-positioned node to some extent.

Figure 14:
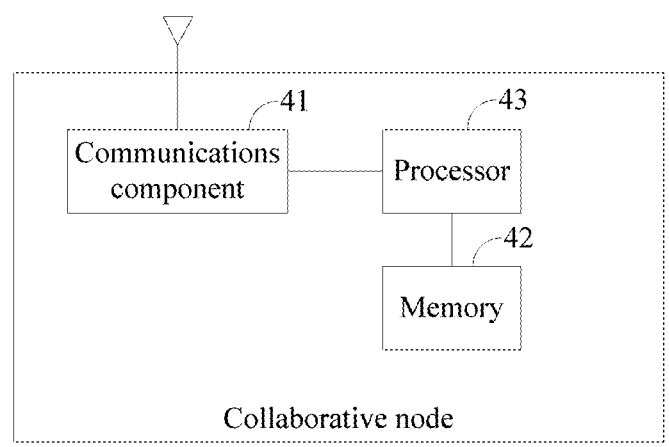
FIG. 14 is still another schematic structural diagram of a collaborative node according to an embodiment of this application.

Referring to FIG. 14, FIG. 14 shows a structure of the collaborative node shown in FIGS. 3A and 3B according to an embodiment of this application, where the collaborative node is a collaborative node communicating with a to-be-positioned node, and the collaborative node may include a communications component 41, a memory 42, and a processor 43.

The communications component 41 is configured to send a collaborative positioning node list corresponding to the collaborative node to the to-be-positioned node, where information about another collaborative node used for assisting the collaborative node in performing positioning on the to-be-positioned node is recorded in the collaborative positioning node list.

In an implementation, that the communications component 41 is configured to send a collaborative positioning node list corresponding to the collaborative node to the to-be-positioned node includes:

The communications component 41 sends a collaborative positioning response message to the to-be-positioned node after a collaborative positioning request sent by the to-be-positioned node in a broadcast mode is received, where the collaborative positioning response message carries at least the collaborative positioning node list and position information of the collaborative node; or That the communications component 41 is configured to send a collaborative positioning node list corresponding to the collaborative node to the to-be-positioned node includes: the communications component 41 pushes a message to the to-be-positioned node, where the message carries the collaborative positioning node list corresponding to the collaborative node.

The memory 42 is configured to store the collaborative positioning node list corresponding to the collaborative node.

The processor 43 is configured to: when a quantity of same collaborative nodes between the collaborative positioning node list corresponding to the collaborative node and a target list corresponding to the to-be-positioned node is greater than a quantity of same collaborative nodes between a collaborative positioning node list corresponding to another collaborative node and the target list, perform positioning on the to-be-positioned node by using each monitoring node and the collaborative node serving as an anchor node, where each monitoring node is each of same collaborative nodes between the collaborative positioning node list corresponding to the anchor node and the target list, and node information of a collaborative node that can directly communicate with the to-be-positioned node is recorded in the target list corresponding to the to-be-positioned node.

According to the foregoing technical solution, when the quantity of same collaborative nodes between the collaborative positioning node list corresponding to the collaborative node and the target list corresponding to the to-be-positioned node is greater than the quantity of same collaborative nodes between the collaborative positioning node list corresponding to the another collaborative node and the target list, positioning is performed on the to-be-positioned node by using each monitoring node and the collaborative node serving as an anchor node, where each monitoring node is each of same collaborative nodes between the collaborative positioning node list corresponding to the anchor node and the target list. In this way, in a positioning process, a quantity of monitoring nodes is greater than a quantity of monitoring nodes corresponding to another anchor node. In same wireless communication coverage, a larger quantity of monitoring nodes leads to a higher possibility of discovering a hidden terminal among the monitoring nodes, so that a probability that the hidden terminal threatens the anchor node is reduced. In addition, when there are a larger quantity of monitoring nodes, more timestamp information is provided for performing positioning on the to-be-positioned node, thereby improving positioning accuracy of the to-be-positioned node to some extent.

In an implementation, the processor 43 is further configured to update the collaborative positioning node list corresponding to the collaborative node.

In an implementation, the performing positioning on the to-be-positioned node by using each monitoring node and the collaborative node serving as an anchor node includes: The processor 43 makes the communications component 41 send a monitoring instruction to each monitoring node, to trigger each monitoring node to obtain a receiving moment at which a fine timing measurement action frame is received, and to obtain a receiving moment at which a fine timing measurement response frame is received.

The processor 43 obtains position information of the anchor node, a sending moment at which the anchor node sends the fine timing measurement action frame, and a second receiving moment at which the anchor node receives the fine timing measurement response frame; makes the communications component 41 send the position information of the anchor node, the sending moment at which the anchor node sends the fine timing measurement action frame, and the second receiving moment at which the anchor node receives the fine timing measurement response frame, to eliminate an error caused when synchronization cannot be implemented between internal clocks of the to-be-positioned node, the anchor node, and each monitoring node, so as to improve calculation accuracy.

In addition, an embodiment of this application further provides a storage medium, where the storage medium stores program code used for executing the positioning method by the to-be-positioned node in FIGS. 3A and 3B and/or stores program code used for executing the positioning method by the collaborative node in FIGS. 3A and 3B.

The embodiments in this specification are all described in a progressive manner, for same or similar parts in the embodiments, refer to these embodiments, and each embodiment focuses on a difference from other embodiments.

The embodiments disclosed above are described to enable a person skilled in the art to implement or use the present disclosure. Various modifications to the embodiments are obvious to the person skilled in the art, and general principles defined in this specification may be implemented in other embodiments without departing from the scope of the present disclosure. Therefore, the present disclosure is not intended to be limited to these embodiments illustrated in this specification, but shall be construed in the widest scope consistent with the principles and novel features disclosed in this specification.

What is claimed is:

1. A collaborative node-based positioning method, wherein the method is executed by a to-be-positioned node, and the method comprises:
   obtaining a collaborative positioning node list corresponding to each collaborative node that is able to directly communicate with the to-be-positioned node, wherein information about one or more nodes that can directly communicate with the collaborative node is recorded in the collaborative positioning node list;

selecting a collaborative node from the collaborative positioning node list having a largest quantity of matching collaborative nodes as that in a target list corresponding to the to-be-positioned node; and positioning on the to-be-positioned node by using an anchor node and each monitoring node, wherein the anchor node is the selected collaborative node, and each monitoring node is each of same collaborative nodes between the collaborative positioning node list corresponding to the anchor node and the target list.

2. The method according to claim 1, wherein the obtaining the collaborative positioning node list corresponding to each collaborative node that can directly communicate with the to-be-positioned node comprises:

sending a collaborative positioning request in a broadcast mode, wherein the collaborative positioning request is used to obtain a collaborative positioning node list; and receiving a collaborative positioning response message sent by each collaborative node that can directly communicate with the to-be-positioned node, wherein the collaborative positioning response message carries at least the collaborative positioning node list or position information of the collaborative node; or the obtaining the collaborative positioning node list corresponding to each collaborative node that can directly communicate with the to-be-positioned node comprises: receiving a message pushed by each collaborative node, wherein the message carries a collaborative positioning node list corresponding to the collaborative node.

3. The method according to claim 1, wherein the selecting, according to the collaborative positioning node list corresponding to each collaborative node, the collaborative node corresponding to the collaborative positioning node list in which the quantity of collaborative nodes being the same as that in the target list corresponding to the to-be-positioned node is largest comprises:

sequentially comparing identification information of all the collaborative nodes in the collaborative positioning node lists with identification information of each collaborative node in the target list corresponding to the to-be-positioned node, to obtain a collaborative node whose identification information is the same as that of each collaborative node in the target list;

calculating a quantity of collaborative nodes, in each collaborative positioning node list, whose identification information is the same as that of each collaborative node in the target list; and selecting a collaborative node corresponding to a collaborative positioning node list in which a quantity of collaborative nodes whose identification information is the same as that of each collaborative node in the target list is largest.

4. The method according to claim 1, wherein the selecting, according to the collaborative positioning node list corresponding to each collaborative node, the collaborative node corresponding to the collaborative positioning node list in which the quantity of collaborative nodes being the same as that in a target list corresponding to the to-be-positioned node is largest comprises:

obtaining a quantity of collaborative nodes comprised in each collaborative positioning node list;

starting from a collaborative positioning node list comprising a largest quantity of collaborative nodes, comparing identification information of each collaborative node in the collaborative positioning node list with identification information of each collaborative node in the target list corresponding to the to-be-positioned node, to obtain a collaborative node whose identification information is the same as that of each collaborative node in the target list; and when a quantity of collaborative nodes, in the collaborative positioning node list on which comparison is performed, whose identification information is the same as that of each collaborative node in the target list is greater than or equal to a quantity of collaborative nodes in a remaining collaborative positioning node list on which no comparison is performed, selecting a collaborative node corresponding to the collaborative positioning node list in which the quantity of collaborative nodes whose identification information is the same as that of each collaborative node in the target list is greater than or equal to the quantity of collaborative nodes in the remaining collaborative positioning node list.

5. The method according to claim 1, wherein the method further comprises: updating information about each collaborative node that can directly communicate with the to-be-positioned node.

6. A to-be-positioned node, wherein the to-be-positioned node comprises:

a receiver to receive a collaborative positioning node list corresponding to each collaborative node that can directly communicate with the to-be-positioned node, wherein information about one or more nodes that can directly communicate with the collaborative node is recorded in the collaborative positioning node list;

a processor to select a collaborative node from the collaborative positioning node list having a largest quantity of matching collaborative nodes as that in a target list corresponding to the to-be-positioned node; and the processor to perform positioning on the to-be-positioned node by using an anchor node and each monitoring node, wherein the anchor node is the selected collaborative node, and each monitoring node is each of same collaborative nodes between the collaborative positioning node list corresponding to the anchor node and the target list.

7. The to-be-positioned node according to claim 6, wherein the receiver to receive the collaborative positioning node list corresponding to each collaborative node that can directly communicate with the to-be-positioned node comprises: the receiver including a transmitter to transmit a collaborative positioning request in a broadcast mode, wherein the collaborative positioning request is used to obtain a collaborative positioning node list;

the receiver to receive a collaborative positioning response message sent by each collaborative node that can directly communicate with the to-be-positioned node, wherein the collaborative positioning response message carries at least the collaborative positioning node list or position information of the collaborative node; and the receiver to receive, from the collaborative positioning response message sent by each collaborative node, the collaborative positioning node list corresponding to each collaborative node; or that the receiver to receive the collaborative positioning node list corresponding to each collaborative node that can directly communicate with the to-be-positioned node comprises: the receiver to receive a message pushed by each collaborative node, wherein the message carries a collaborative positioning node list corresponding to the collaborative node.

8. The to-be-positioned node according to claim 6, wherein the processor is further:
   to sequentially compare identification information of all the collaborative nodes in the collaborative positioning node lists with identification information of each collaborative node in the target list corresponding to the to-be-positioned node, to obtain a collaborative node whose identification information is the same as that of each collaborative node in the target list;
   to calculate a quantity of collaborative nodes, in each collaborative positioning node list, whose identification information is the same as that of each collaborative node in the target list; and
   to select a collaborative node corresponding to a collaborative positioning node list in which a quantity of collaborative nodes whose identification information is the same as that of each collaborative node in the target list is largest.

9. The to-be-positioned node according to claim 6, wherein the processor is further:
   to obtain a quantity of collaborative nodes comprised in each collaborative positioning node list, and configured to, starting from a collaborative positioning node list comprising a largest quantity of collaborative nodes, compare identification information of each collaborative node in the collaborative positioning node list with identification information of each collaborative node in the target list corresponding to the to-be-positioned node, to obtain a collaborative node whose identification information is the same as that of each collaborative node in the target list; and
   when a quantity of collaborative nodes, in the collaborative positioning node list on which comparison is performed, whose identification information is the same as that of each collaborative node in the target list is greater than or equal to a quantity of collaborative nodes in a remaining collaborative positioning node list on which no comparison is performed, to select a collaborative node corresponding to the collaborative positioning node list in which the quantity of collaborative nodes whose identification information is the same as that of each collaborative node in the target list is greater than or equal to the quantity of collaborative nodes in the remaining collaborative positioning node list.

10. The to-be-positioned node according to claim 6, wherein the processor is to update information about each collaborative node that can directly communicate with the to-be-positioned node.

* * * * *